United States Patent Office 3,421,758
Patented Jan. 14, 1969

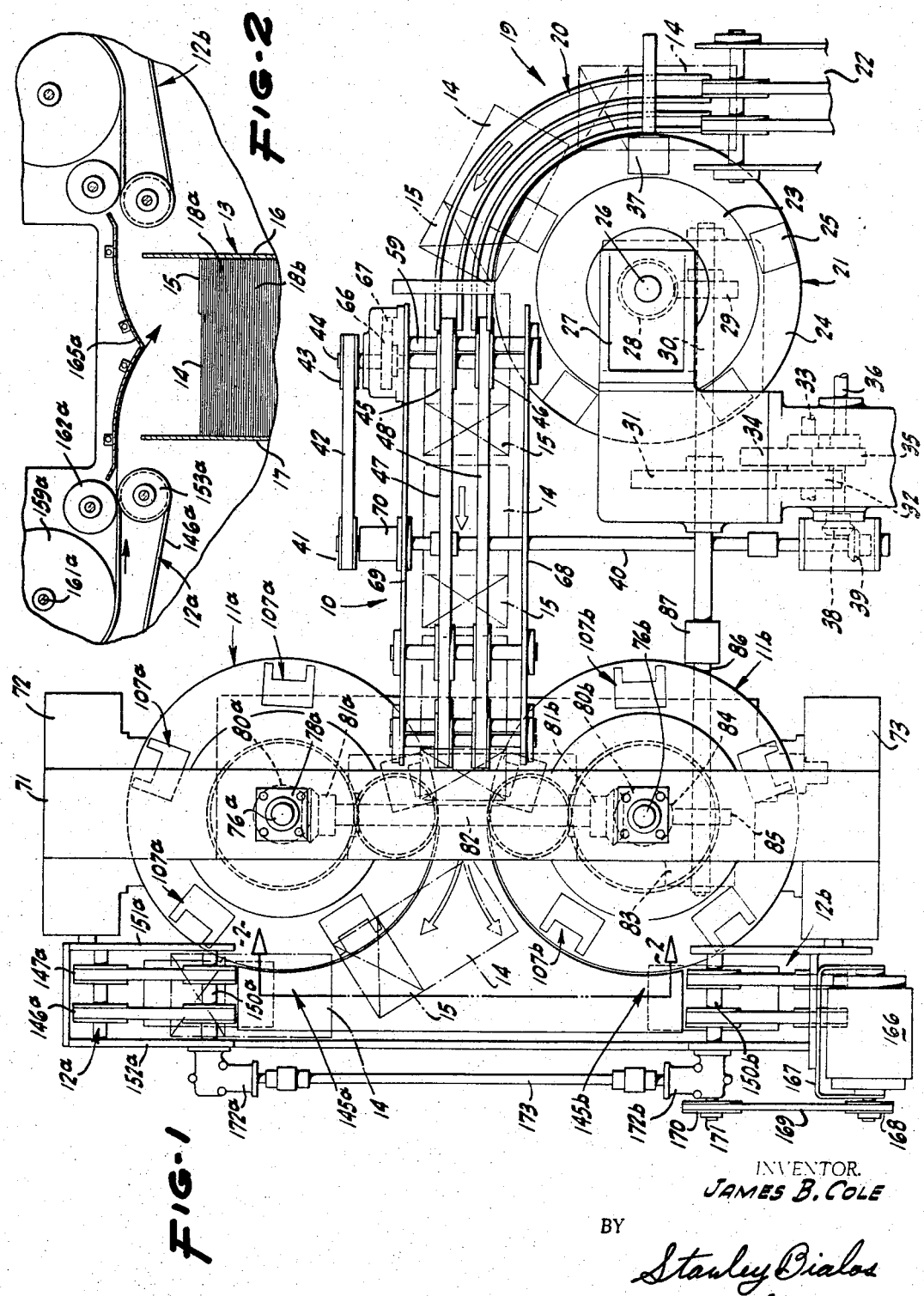

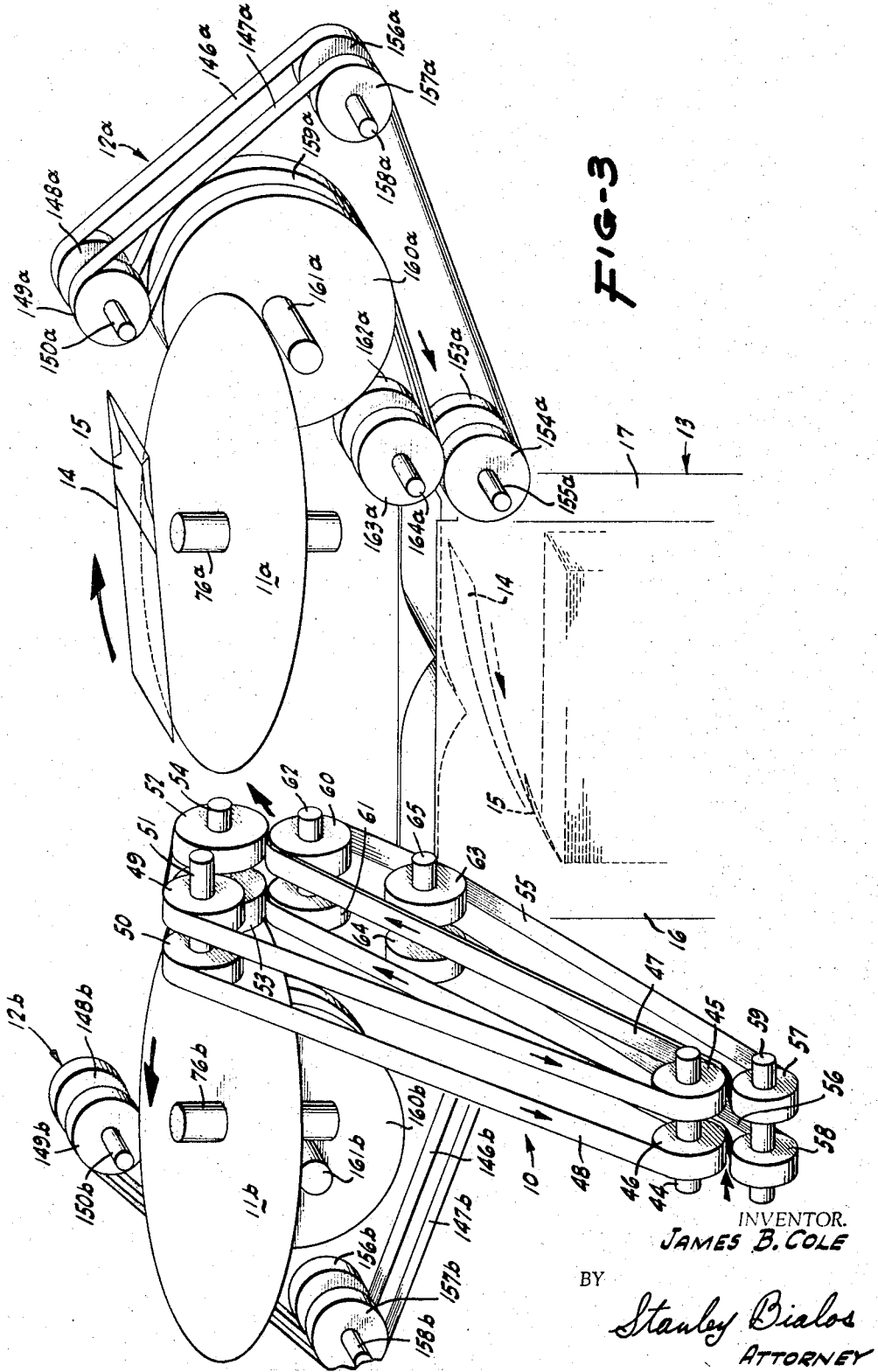

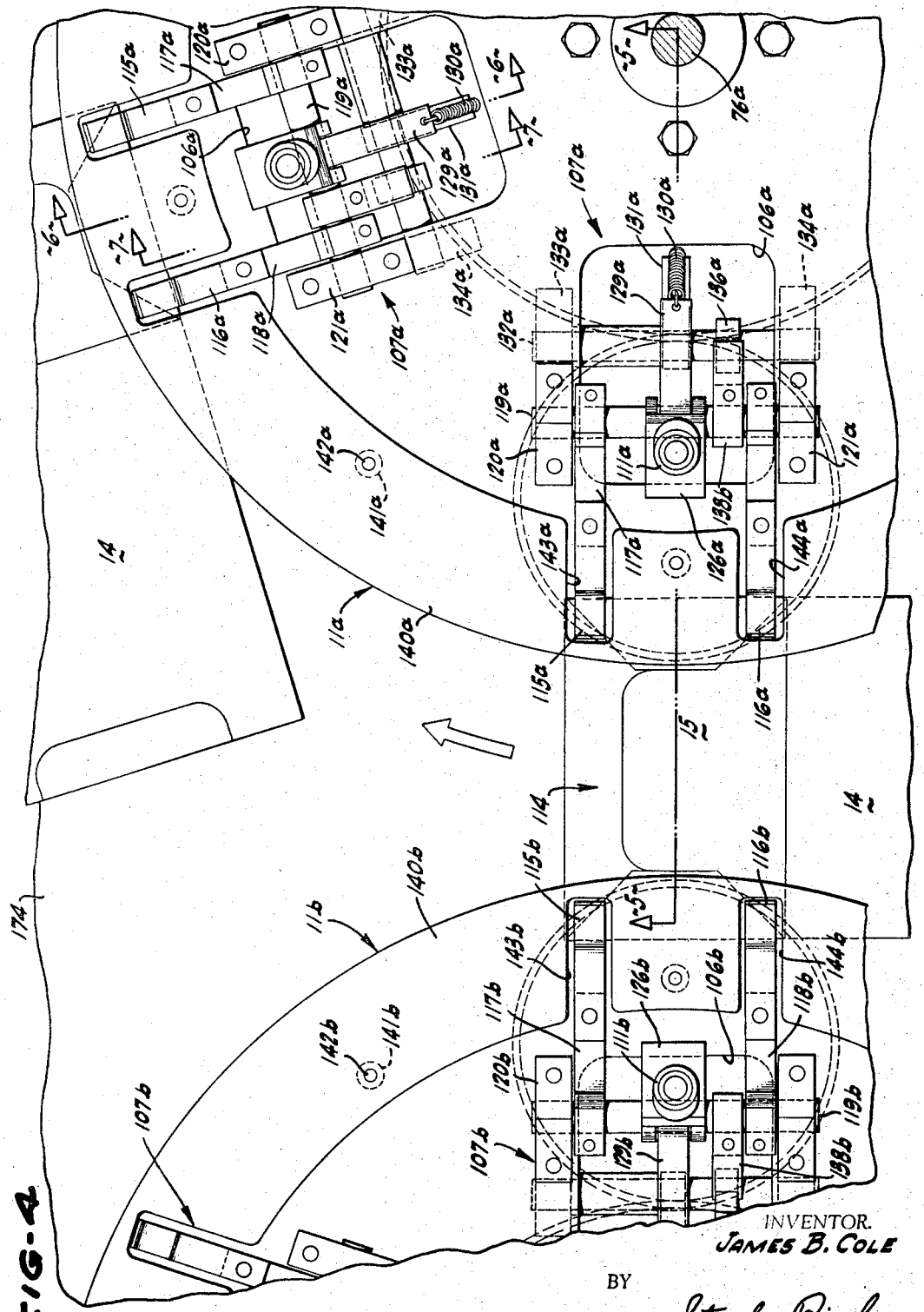

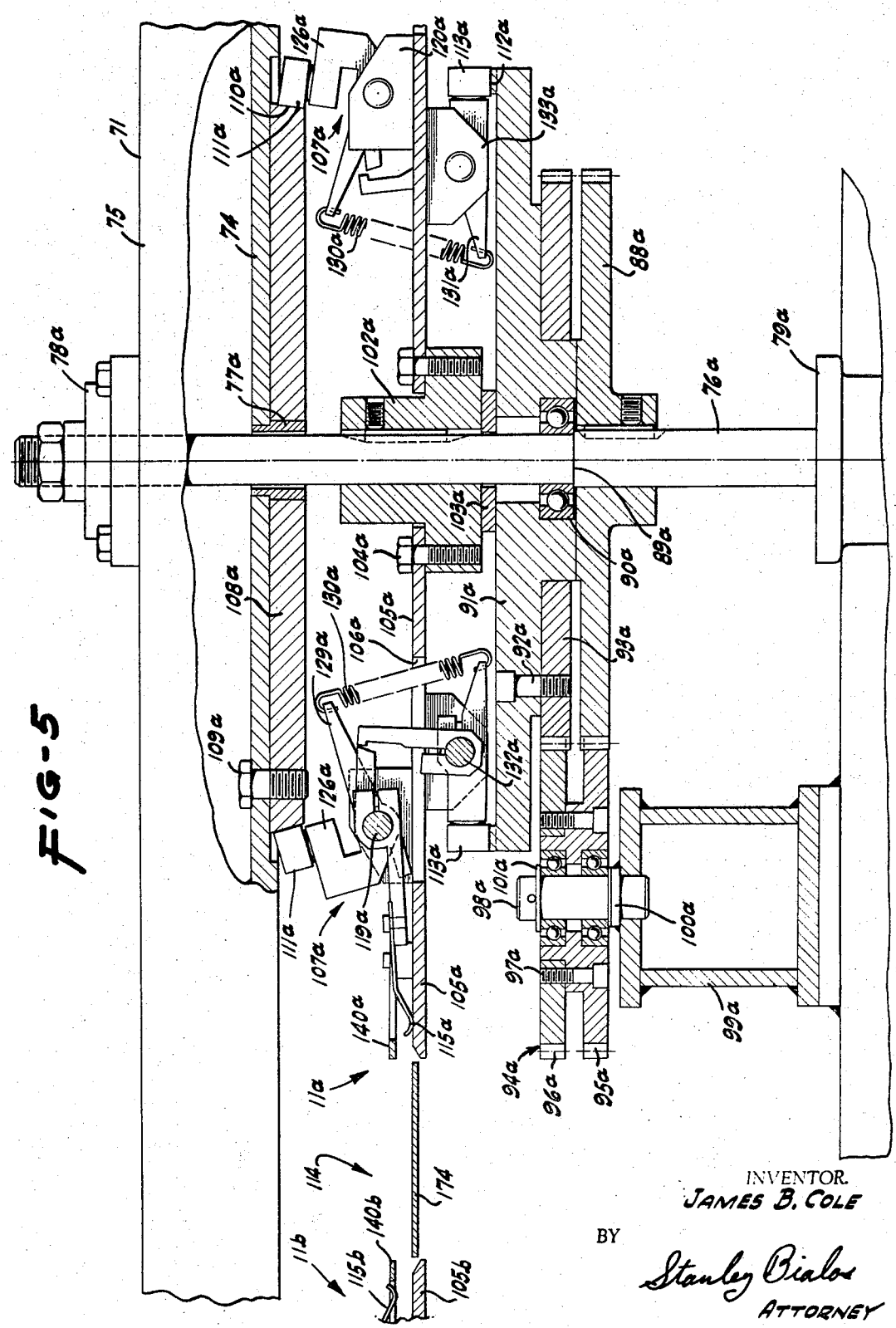

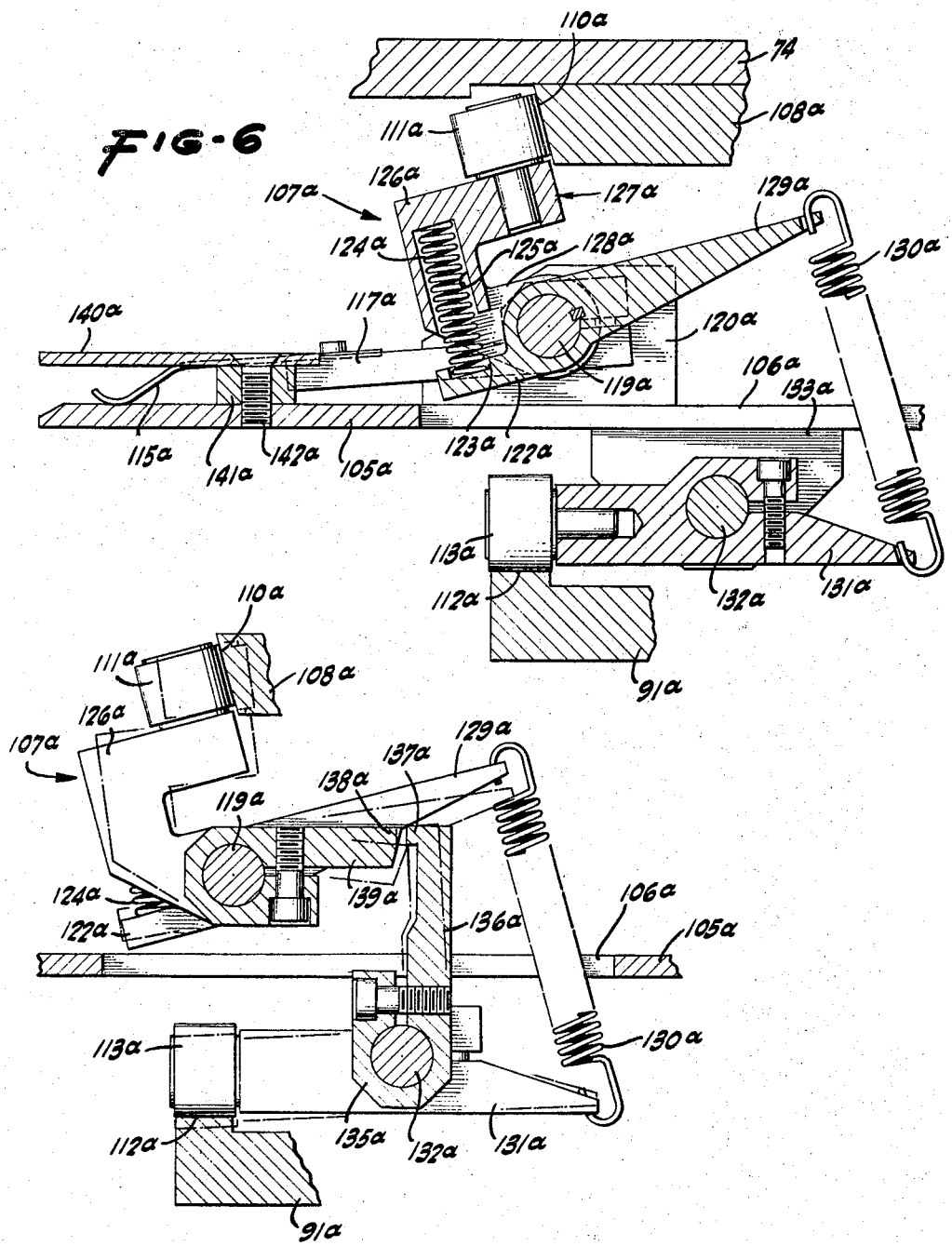

---

3,421,758
SPLIT-STREAM COLLATING APPARATUS
James B. Cole, Mercer Island, Wash., assignor to Crown Zellerbach Corporation, San Francisco, Calif., a corporation of Nevada
Filed Apr. 2, 1965, Ser. No. 445,086
U.S. Cl. 271—82                                 14 Claims
Int. Cl. B25h 29/06; B25g 3/00; B25g 57/00

ABSTRACT OF THE DISCLOSURE

Collating apparatus for orientating relatively flat articles such as paper grocery bags so that alternate groups thereof have their thick bottoms disposed in opposite directions to cause any bundle comprising a plurality of such groups to be of relatively uniform dimension thereacross. The apparatus includes a pair of spaced apart collating units defining a bag-gripping station therebetween into which bags are advanced one by one in the same direction. Each collating unit is in the form of a rotatable wheel or support element equipped with a plurality of angularly spaced bag-grippers each adapted to close at the bag-gripping station to engage a bag thereat and carry the same to a discharge station angularly spaced therefrom at which the gripper then opens to release the bag. The collating units are operated in enforced synchronism such that the gripper of one unit are cyclically constrained in an inoperative condition for a predetermined period during which a plurality of bags successively advanced into the gripping station are gripped and transported by the other unit to the discharge station associated therewith, and vice versa.

---

This invention relates to collating apparatus and, more particularly, to a collator for relatively flat articles such as paper grocery bags.

In packaging generally flat articles which are somewhat thicker along one edge or end portion thereof than elsewhere, it is common to collate or alternate the articles in a predetermined progression such that when a substantial number thereof are grouped together to form a package, the package is of relatively uniform dimension thereacross. Self-opening, paper grocery bags are an example of articles of this type since they are open at one end and have a closed bottom which is folded in a manner such that it overlaps a portion of the bag side wall. Consequently, each bag is thicker throughout such overlapped portion thereof (and is also generally thicker throughout its closed bottom), and the bags prior to their being packaged are usually collated so that a predetermined number thereof comprising a "hand" all have their bottoms oriented in one direction, the next group comprising thereof oriented in the opposite direction, and successive bags are similarly alternated end-for-end in an arrangement such that a bundle or package constituting a plurality of hands is of relatively uniform dimension thereacross.

The present invention is directed to an improved collator in which a stream of relatively flat articles such as paper grocery bags and the like is divided into a plurality of sub-streams, the bags in each such sub-stream are respectively grouped in the same orientation into a stack or hand, and the hands of the various sub-streams are assembled in an alternate end-for-end disposition to form a bundle or package of substantially uniform dimension thereacross. In the particular embodiment of the invention illustrated and described herein, there are two sub-streams and the articles respectively following the paths of movement defined thereby are collected in opposite orientation at a common collection station. In this respect, a predetermined number of articles constituting one of the sub-streams are collected into a hand at such station, and thereafter another predetermined number of articles constituting the other sub-stream are collected into an oppositely oriented hand at the collection station. Accordingly, the articles are cyclically diverted in such particular embodiment so that a predetermined number thereof move first along one flow path, then another predetermined number thereof move along the other flow path, and the cycle is thereafter repeated.

The improved apparatus comprises a pair of spaced apart collating units that define therebetween a path of movement along which the successive articles are advanced. Although the orientation is not critical, such collating units are horizontally disposed and are in the general form of wheels that rotate in opposite directions or toward each other along such path of movement in partially overlapping relation therewith. Each of the collating units includes a plurality of article grippers which are selectively operative to grip an article moving between the two wheels and rotate such article through a predetermined angular distance and then release the same so that it can continue to be advanced along a predetermined path constituting one of the aforementioned sub-streams. The collating units are selectively operative so that one is effective to control the movement of a predetermined number of bags while the other unit is idling, and vice versa. Timing means are incorporated in the apparatus to automatically alternate control of such articles from one to the other of the collating units after a predetermined number of articles has been processed thereby.

An embodiment of the invention is illustrated in the accompanying drawings, in which FIGURE 1 is a top plan view of collating apparatus embodying the invention;

FIGURE 2 is a broken transverse sectional view illustrating the collection station and being taken along the line 2—2 of FIGURE 1;

FIGURE 3 is a diagrammatic perspective view illustrating the general organization of the collator and mode of operation thereof;

FIGURE 4 is an enlarged top plan view of the collating units—the view being taken just below the transverse frame element or bridge shown in FIGURES 1 and 5;

FIGURE 5 is a transverse sectional view taken along the line 5—5 of FIGURE 4;

FIGURE 6 is a radially disposed sectional view taken along the line 6—6 of FIGURE 4;

FIGURE 7 is a sectional view taken along the line 7—7 of FIGURE 4; and

Figure 8:
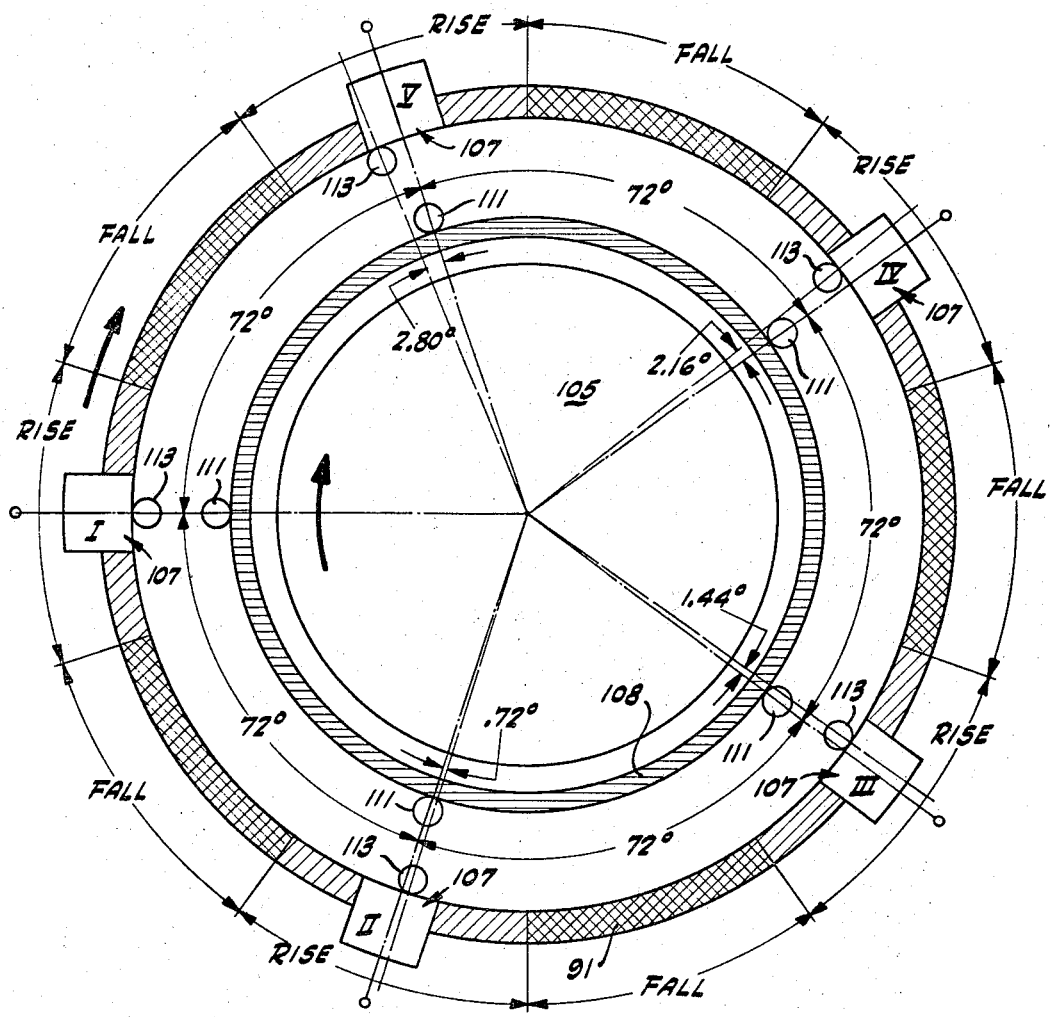
FIGURE 8 is a diagrammatic view depicting the timing interrelationship of the cams and cam followers of the apparatus which determine an operational sequence thereof.

As shown best in FIGURES 1 and 3, the collating apparatus includes an infeed conveyor generally denoted with the numeral 10, a pair of spaced apart collating units 11a and 11b, a pair of discharge conveyors 12a and 12b respectively associated with the collating units 11a and 11b, and a common collection station 13. Relatively flat articles such as the bags 14 are advanced in succession along the infeed conveyor 10 to the collating units 11a and 11b which are selectively operative to change the direction of movement of the articles 14 by approximately 90° and feed the same into one or the other of the discharge conveyors 12a and 12b. The bags are ejected from the discharge conveyors into the collection station 13.

The bags 14 are conventional self-opening, paper grocery bags which are open at one end and have a closed bottom 15 which is folded; and because it comprises a plurality of thicknesses and partially overlaps a side wall of the bag, the bag is slightly thicker along the folded bottom portion thereof than elsewhere. Since the direction of movement of the bags is altered by each collating unit 11 by 90°, and because the discharge conveyors 12a and 12b which are respectively associated with the conveyor units define paths of movement that diverge outwardly and then converge inwardly toward the collection station 13, the bags respectively ejected from the discharge conveyors 12a and 12b have their closed ends 15 oriented in opposite directions. Thus, the bags 14 that are ejected from the discharge conveyor 12a have the bottoms 15 located along the right-hand side of the collection station 13 (as viewed in FIGURE 2) or, more specifically, in abutment with the vertical wall 16 of the magazine that defines the collection station. Similarly, the bags ejected by the discharge conveyor 12b have the closed bottoms 15 oriented in the opposite direction, or in abutment with the vertical wall 17 of the collection magazine.

The apparatus operates in a time relationship such that the collating unit 11a processes a predetermined number of successive bags (say, for example, 50) which comprise a hand or group denoted in FIGURE 2 with the numeral 18a, and the collating unit 11b processes a similar predetermined number of successive bags comprising another hand or group designated in FIGURE 2 with the numeral 18b. Accordingly, the collating units 11a and 11b are alternately operative in a cyclic manner to process successive numbers of bags comprising oppositely oriented groups or hands at the collection station. A predetermined number of hands 18 stacked one upon another are removed from the collection station 13 manually or, more usually, by conveyor means (not shown); and generally grocery bags are packaged in bundles of 500 so that ten groups or hands would be stacked one upon another and then removed from the collection station.

The infeed conveyor 10 is shown in FIGURE 1 in association with a turning unit 19 that includes a plurality of arcuate rails generally denoted 20 and a turning wheel 21. The rails 20 constitute four in number in the particular structure illustrated, and are disposed in substantially parallel, spaced apart relation to define a path of movement along which each bag 14 is advanced. The rails 20 at one of their ends are disposed in alignment with the discharge conveyor 22 of a conventional bag-making machine (not shown). The rails traverse an arcuate path of approximately 90°, and the opposite ends thereof terminate in alignment with the infeed conveyor 10 of the collating apparatus.

The turning unit 19 is not essential to the present invention and may be omitted—successive bags, in such event, being delivered to the infeed conveyor 10 by any suitable means. However, it may be noted that the turning wheel 21 is substantially the same structurally and functionally as the collating units 11 except that it operates continuously to grasp each bag 14 being discharged from the conveyor 22, change the direction of movement thereof by 90°, and release the same into the infeed conveyor 10. In contrast, the collating units 11 are selectively operative and have alternate operating and idling modes.

Accordingly, the structural features and operation of the turning wheel 21 will become evident when the collating units 11 are described in detail, but for convenience it may be noted here that the turning wheel includes a finger plate 23, a guide plate 24 in the form of an annulus supported above the finger plate, and a plurality (five) of bag-gripping devices 25 spaced from each other by equal angular distances. The bag grippers 25 are carried by the plates 23 and 24 so as to rotate therewith in a counterclockwise direction (as viewed in FIGURE 1); and to effect such rotation, the plate 23 is mounted upon a shaft 26 that is supported for rotation in suitable frame structure, such as the upper frame element 27 shown in FIGURE 1.

The shaft 26 is equipped with a gear 28 that meshes with a complementary spiral gear 29 carried by a drive shaft 30 supported for rotation in frame structure therefor. The shaft 30 carries a relatively large diameter gear 31 that meshes with a spur gear 32 of smaller diameter mounted upon a stub shaft 33 which also carries an idler gear 34. The idler 34 is driven by a gear 35 which is mounted upon a common input shaft 36 operatively connected to the aforementioned bag machine so as to be driven in timed relation therewith. Consequently, as the main input shaft 36 is rotatably driven, the turning wheel 21 is continuously rotated and the various grippers 25 are sequentially moved into the 90° location defining the bag-gripping station (denoted 37 for identification) to grip the bags successively delivered thereto from the discharge conveyor 22 and advance each such bag to the infeed conveyor 10.

The main input shaft 36 is seen to be equipped at the inner end thereof with a bevel gear 38 in mesh with a complementary bevel gear 39 mounted upon a shaft 40 that extends through the infeed conveyor 10 and is equipped at the end thereof with a pulley wheel or sheave 41. Entrained about the sheave 41 is a belt 42 which is also entrained about a driven pulley wheel 43 mounted upon a shaft 44 equipped intermediate the ends thereof with a pair of spaced apart pulley wheels 45 and 46. Respectively entrained about the wheels 45 and 46 are a pair of long conveyor belts 47 and 48 that respectively pass over a pair of guides in the form of idler pulleys 49 and 50 that are mounted upon a shaft 51. The belts 47 and 48 are then respectively entrained about a pair of pulley wheels 52 and 53 that are mounted upon a shaft 54.

Disposed below the belts 47 and 48 in respective alignment therewith and in contiguous juxtaposition with the lower or bag-engaging reaches thereof are a pair of elongated belts 55 and 56 that at one end thereof are respectively entrained about pulley wheels 57 and 58 that are mounted upon a shaft 59, and at their opposite ends are respectively entrained about pulley wheels 60 and 61 which are mounted upon a shaft 62. Intermediate the respectively associated wheels 57–60 and 58–61, the belts 55 and 56 respectively pass over a pair of guide or idler pulleys 63 and 64 which are mounted upon a shaft 65. The shafts 44 and 59 both extend into a gear box and are respectively equipped thereat with gears 66 and 67 which are in mesh, wherefore both of the shafts 55 and 59 are positively driven as are the pulley wheels 45–46 and 57–58 which are respectively mounted thereon. Therefore, the upper belts 47 and 48 are positively driven in the direction of the arrows thereon in FIGURE 3, and the lower belts 55 and 56 are similarly driven in the direction of the arrows thereon.

All of the shafts 44, 51, 54, 59, 62 and 65 are journalled for rotation in suitable bearings therefor that are carried by side plates 68 and 69 of the conveyor 10, and the input shaft 40 to the conveyor 10 is similarly journalled for rotation in a bearing structure 70 carried by the side plate 69 of the infeed conveyor. Evidently, then, the infeed conveyor 10 is continuously driven from the main input shaft 36, and each successive bag fed to the infeed conveyor by the turning unit 19 is gripped by the nip defined between the respectively contiguous belts 45–55 and 48–56, which belts carry such bag toward the discharge end of the infeed conveyor adjacent the collating units 11.

The collating units 11a and 11b are spaced apart transversely and define therebetween the path of movement of the bags 14, which path of movement is in effect an extension and a part of the path of movement defined by the infeed conveyor 10. The collating units 11 are supported in such spaced apart relation by frame structure including a relatively narrow, transversely extending bridge or upper frame element 71 (FIGURES 1 and 5) which mounted at the ends thereof on upwardly extending standards 72 and 73. The bridge 71 may be welded or other wise rigidly secured to the standards 72 and 73, which at their lower ends are adapted to be positioned upon the floor or other support surface therefor. The units 11a and 11b are essentially identical except that they rotate in opposite angular directions; and in the subsequent description, only the unit 11a will be discussed in detail.

Referring to FIGURE 5 in particular, the bridge 71 is seen to include a horizontally disposed span or plate 74 having a shell-like cover 75 secured thereto. The collating unit 11a includes an upwardly extending shaft 76a that extends through a bearing 77a provided therefor in the span 74 and upwardly therefrom through bearing support 78a bolted or otherwise fixedly secured to the bridge 71 and in particular to the casing 75 thereof. Adjacent its lower end, the shaft 76a extends into a gear housing 79a and is equipped therein with a bevel gear 80a (FIGURE 1) in mesh with a complementary bevel gear 81a that is mounted upon a shaft 82 extending between the two collating units, and which is equipped adjacent its opposite end with a bevel gear 81b in mesh with a bevel gear 80b that is mounted upon the shaft 76b of the collating unit 11b. The shaft 82 projects beyond the shaft 76b and into a gear box 83 where it has mounted thereon a gear 84 which meshes with a spiral gear 85 that is mounted upon a shaft 86 fixedly related to the aforementioned shaft 30 through a couple 87. Accordingly, since the shaft 30 is continuously rotated in timed relation with the bag-making machine, as heretofore described, the collating units 11a and 11b are each continuously rotated in timed relation with such bag-making machine.

Returning to FIGURE 5, the shaft 76a is seen to be equipped intermediate the span 74 and gear housing 79a with a drive gear 88a that is keyed to the shaft and secured thereto by a set screw so that both relative rotation and relative longitudinal displacements therebetween are prevented. The shaft 76a has a slightly reduced diameter above the gear 88a with the result that the mergence of the larger and smaller diameter sections of the shaft defines a shoulder 89a upon which seats the inner race of a roller bearing composition 90a. The bearing 90a rotatably supports a lower cam or cycling cam 91a which, therefore, is rotatable relative to both the shaft 76a and gear 88a.

Fixedly secured to the cycling cam 91a, as by means of cap screws 92a, is a driven gear 93a which, accordingly, is constrained to rotate with the cam 91a. As is most evident in FIGURE 5, the diameter of the driven gear 93a is substantially the same as the diameter of the drive gear 88a, and such gears are drivingly interconnected through an idler gear structure generally denoted 94a. The idler gear structure includes a lower section 95a in mesh with the drive gear 88a and driven thereby; and further includes an upper section 96a in mesh with the gear 93a so as to drive the same. The two idler gear sections are fixedly secured to each other by cap screws 97a, and are supported for rotation with respect to a stub shaft 98a by suitable ball bearing compositions, as illustrated.

The shaft 98a may be welded or otherwise rigidly secured to frame structure 99a, and the lower ball bearing composition seats upon an annular shoulder 100a provided by the stub shaft. The idler gear structure 94a is prevented from moving upwardly along such shaft 98a by a conventional pin-and-washer stop structure, generally indicated with the numeral 101a.

Evidently, as the shaft 76a is continuously rotated, in the manner heretofore described, the drive gear 88a will be rotated therewith which, in turn, will cause the driven gear 93a to be rotated because of the connection thereof with the drive gear 88a defined through the idler gear structure 94a. Therefore, the cycling cam 91a will be rotated whenever rotational movement is imparted to the shaft 66a; but the angular velocities of the shaft 76a and cycling cam 91a are made to differ by a precise predetermined amount through the described gear train comprising the drive gear 88a, driven gear 91a and idler gear structure 94a which together define differential gearing.

More particularly, the differential gear train is designed so that the cam 91a rotates more slowly than the shaft 76a in a predetermined ratio therewith such that the cam looses a fixed angular distance with respect to the shaft during each 360° rotation thereof. As a specific example (it being understood that the precise relationship will depend upon the intended use of any installation), in one particular apparatus the cycling cam 91a looses an angular distance of 3.6° for each complete rotation of the shaft 76a, or 36° during ten rotations of the shaft. The purpose of this relative velocity relationship concerns the automatic shifting of the control of successive bags from one of the collating units (11a or 11b, as the case may be) to the other, as will be described in greater detail hereinafter.

Fixedly secured to the shaft 76a by means of both a key and set screw is a hub 102a which is located above the cycling cam 91a and may be separated therefrom by a spacer 103a. Secured to the hub 102a, as by means of a plurality of cap screws 104a, is a finger plate 105a. The finger plate 105a is generally planar and is provided with a plurality (there being five in the specific structure illustrated) of recesses or openings 106a thereabout spaced apart by equal angular distances. Carried by the finger plate 105a so as to rotate therewith are a plurality of bag-gripping devices each of which is generally designated with the numeral 107a, and in the embodiment of the apparatus under consideration, there are five such bag-gripping devices carried by each finger plate and such devices are respectively associated with the openings 106a provided thereby. Clearly, then, the finger plate 105a and bag-gripping devices 107a carried thereby are rotated at an angular velocity coincident with the shaft 76a and, necessarily then, the finger plate and bag-gripping devices rotate in a slightly greater velocity than that of the cycling cam 91a.

It will be evident in FIGURE 5 that the apparatus is also equipped with an upper stationary or actuator cam 108a which is rigidly related to the horizontally disposed span or plate 74 by cap screws 109a. Accordingly, the shaft 76a, bottom cam 91a and finger plate 105a rotate relative to the upper actuator cam 108a—the aforementioned bearing 77a affording rotation of the shaft relative to the cam 108a and span 74. The configurated or control surface of the actuator cam 108a constitutes the perimetric edge 110a thereof, and adapted to ride thereon are a plurality of cam followers 111a respectively provided by the bag-gripping devices 107a. The cam-configurated control surface of the cycling cam 91a constitutes the upwardly extending annular edge 112a thereof, and riding thereon are a plurality of cam followers 113a respectively provided by the bag-gripping devices 107a.

The function of the actuator cam 108a is to cause each of the bag-gripping devices 107a to grip a bag 14 each time the device is rotated into the bag-gripping station, shown most clearly in FIGURES 4 and 5 and identified therein with the numeral 114. The cycling cam 91a, on the other hand, is operative at certain predetermined times to prevent the devices 107a from gripping a bag as each device is advanced into the station 114, even though the actuator cam 108a tends to enforce a bag gripping motion onto the device.

Each of the bag-gripping devices 107a, as shown most clearly in FIGURES 6 and 7, includes a pair (see FIGURE 4) of resilient gripper fingers 115a and 116a which are respectively secured by cap screws to arms 117a and 118a. Considering one of the devices 107a, the arms 117a and 118a thereof are spaced apart angularly and are clamped to a pivot shaft 119a journalled for rotation in spaced apart bearings 120a and 121a fixedly secured to the finger plate 105a so as to rotate therewith and oriented along opposite sides of the associated opening 106a. Secured to the shaft 119a so as to rotate therewith, and being disposed substantially midway between the arms 117a and 118a, is an actuator lever 122a recessed, as shown at 123a, so as to provide a seat for the lower end of a helical spring 124a that extends upwardly therefrom into a bore or passage 125a defined within the intermediate portion 126a of a cam follower structure 127a having bifurcated support arms 128a that are spaced apart along the pivot shaft 119a and are supported thereon so as to be freely rotatable with respect thereto. The resilient force provided by the helical spring 124a tends to bias the cam follower 111a in a clockwise direction about the axis of the pivot shaft 119a and into engagement with the configurated surface 110a of the actuator cam 108a. Correspondingly, the spring 124a tends to bias the actuator arm 122a in a counter-clockwise direction relative to the axis of the pivot shaft 119a so as to urge the gripper fingers 115a and 116a downwardly toward abutment thereof with the finger plate 105a, as shown in FIGURE 6.

The actuator arm 122a is equipped with an outwardly extending projection 129a having adjacent the outer end thereof an opening into which is inserted one end of an elongated coil spring 130a that extends downwardly therefrom through the opening 106a in the finger plate. At its opposite end, the spring 130a is anchored within an opening provided by a cam follower structure 131a which is clamped to a pivot shaft 132a journalled for rotation in spaced apart bearing structures 133a and 134a secured to the underside of the finger plate 105a along the opposite edges of the opening 106a. The cam follower structure 131a carries the aforementioned cam follower 113a, and it will be evident that the resilient force provided by the coil spring 130a tends to bias the cam follower 113a in a counter-clockwise direction relative to the axis of the pivot shaft 132a and into engagement with the configurated surface of the cycling cam 91a. By the same token, the resilient biasing force of the spring 130a tends to urge the actuator 122a and projection 129a thereof in a clockwise direction relative to the axis of the pivot shaft 119a and, therefore, urges the shaft 132a, as well as the arms 117a and 118a and respectively associated gripper fingers 115a and 116a, in the same direction.

Also clamped to the pivot shaft 132a is a latch 135a having an arm or extension 136a extending upwardly through the opening 106a in the finger plate 105a. Adjacent its upper terminal end, the extension 136a has a shoulder or abutment 137a adapted to receive thereunder and engage the end portion 138a of a lock-out arm 139a that is bolted or otherwise clamped to the pivot shaft 119a. It will be evident from FIGURE 7 that as the cam follower 113a rides along the surface 112a and is displaced from the uppermost position thereof illustrated to a lower position, the pivot shaft 132a and latch 135a, and extension 136a thereof, will be displaced in a counter-clockwise direction from the essentially vertical position illustrated. Similarly, as the cam follower 111a rides along the surface 110a of the actuator cam 108a and is thereby periodically displaced from the outermost position illustrated to an inner position, the pivot shaft 119a will be permitted to rotate in a clockwise direction because of the resilient force applied thereto from the coil spring 130a via the projection 129a, whereupon the lock-out arm 139a will be displaced with the pivot shaft in such clockwise direction.

The function of the latch mechanism comprising the latch 135a and lock-out arm 139a is to make the bag-gripping devices 107a inoperative at certain particular times. In this connection, so long as the cam follower 113a is traversing a raised surface portion of the cycling cam 91a, as shown in FIGURE 7, the latch 135a and lock-out arm 139a are in the relative positions shown and are therefore ineffective to interfere with angular displacements of the pivot shaft 119a as pivotal movement is enforced thereon by the actuator cam 108a and cam follower 111a. However, when the cam follower 113a encounters a depressed segment of the cam 91a and is therefore displaced downwardly, the latch 135a is displaced in a counter-clockwise direction.

If, at this time, the cam follower 111a is traversing a depressed segment of the actuator cam 108a, it will be displaced in a clockwise direction, relative to the axis of the pivot shaft 119a, from the position shown in FIGURE 7, whereupon the reduced force then applied by the helical spring 124a to the actuator lever 122a will permit the same to rotate slightly in a clockwise direction with the result that the pivot shaft 119a to which it is clamped will also rotate in the same direction, as will the lock-out arm 139a. The magnitude of such displacement of the lock-out arm will be such that the end portion 138a thereof will be located below the abutment 137a of the latch extension 136a. Consequently, as the latch abutment moves over the end portion 138a of the lock-out arm, such arm will be constrained against movement in a counter-clockwise direction for so long as the latch remains in the lock-out position thereof.

Once the lock-out position is attained, it will be maintained for a predetermined period which, in accordance with the prior example, will be equivalent to the processing of one complete 50 bag hand by the opposite collating unit 11b. During this time period, the finger plate 105a and, therefore, the bag-gripping units 107a will make ten complete revolutions. Evidently, then, each of the cam followers 111a will traverse the configurated surface 110a of the stationary actuator cam 108a ten complete times and, necessarily, will be periodically displaced inwardly and outwardly in accordance with the shape of the cam surface.

The resulting angular displacements of each cam follower 111a, and associated cam follower structure 126a of which it forms a part, is resisted only by the resilient force of the helical spring 124a since the cam follower structure is otherwise freely pivotal relative to the shaft 119a. Consequently, during such angular displacements of the structure 126a with the lock-out arm constrained against movement, the spring 124a simply acts as a cushion or yieldable element that permits such angular displacements of the cam follower structure while the actuator lever 122a, pivot shaft 119a and lock-out arm 139a remain stationary. Accordingly, each of the cam follower structures 126a continues to be reciprocated as its associated bag-gripping device 107a is revolved about the stationary actuator cam 108a. However, the gripper fingers 115a and 116a are not similarly reciprocated, but remain in the open position thereof (shown by the finger 115b in FIGURE 5) because they are fixedly carried by the pivot shaft 119a which is constrained against angular displacements because of the interaction of the latch 135a and lock-out arm 139a.

Accordingly, the collating unit 11a is inoperative in the idling condition thereof to control the movement of bags 14 because the gripper fingers 115a and 116a of the various bag-gripping devices 107a are continuously maintained in their open or elevated position. Evidently, during the period that the collating unit 11a is made inoperative to control the movement of bags, the unit 11b must then be operative to grip each successive bag advanced into the bag gripping station 114. Thus, in this respect, the collating units 11a and 11b operate in opposite phase relationship and such relationship is positively maintained, when once established, because such collating units are substantially identical structurally and are synchronously driven from the same drive means.

It will be noted in FIGURES 4 through 6 that each of the collating units is equipped with a guide plate which, in the case of the unit 11a, is denoted with the numeral 140a. The guide plate 140a is generally planar and is in the form of an annulus having substantially the same outer diameter as that of the finger plate 105a. The guide plate is located above the finger plate and is maintained in spaced relation therewith by a plurality of spacers 141a, and is rigidly related to the finger plate by a plurality of fasteners 142a, such as the rivets illustrated, which respectively extend through the spacers. As is most evident in FIGURE 4, the guide plate is provided with a plurality of recesses or channels therein respectively aligned with the gripper fingers 115a and 116a and adapted to freely pass the fingers therethrough. For purposes of identification, the recesses associated with each bag-gripping device are respectively denoted with the numerals 143a and 144a.

Each bag 14 as it is advanced through the gripping station 114, passes between the finger plates and guide plates 105a–140a and 105b–140b, and the gripper fingers of the bag-gripping device which is then operative, closes onto the bag to clamp it to the associated finger plate. It will be noted, especially in FIGURE 6, that the outer terminal end portions of the gripper fingers are inclined inwardly and downwardly and are turned upwardly at their end portions to form an arcuate configuration. Further, the gripper fingers are resilient so that they can yield slightly to accommodate bags of varying thickness and yet are operative to resiliently clamp each such bag to the underlying finger plate. Accordingly, each of the gripper fingers may be in the general form of a leaf spring and can be made from any suitable material having the described characteristics such as spring steel.

As viewed in FIGURE 4, the collating unit 11a is in the operative condition thereof and functions to grip successive bags 14 and rotate the same through approximately 90° from the gripping station 114 and into a release station, designated 145a in the case of the collating unit 11a and 145b in the case of the collating unit 11b (see FIGURE 1). As shown in FIGURE 4, the collating unit 11a rotates in a clockwise direction and the collating unit 11b rotates in a counter-clockwise direction; and the two release stations 145 are respectively located adjacent the infeed ends of the discharge conveyors 12a and 12b—the construction of which will now be considered.

Referring to FIGURES 1, 2 and 3 in particular, it will be seen that the discharge conveyor 12a comprises a pair of spaced apart conveyor belts 146a and 147a which are disposed in side-by-side relation and are respectively entrained adjacent one of the ends thereof about drive pulleys 148a and 149a mounted upon a common shaft 150a supported for rotation adjacent the opposite ends thereof in inner and outer frame elements 151a and 152a. Adjacent the opposite ends thereof, the conveyor belts are entrained about lower pulley wheels 153a and 154a mounted upon a common shaft 155a journalled for rotation in such inner and outer frame elements. The belts also pass over take-up pulleys 156a and 157a which may be mounted upon a common shaft 158a appropriately supported by the frame elements with the usual biasing structure operative to tension the conveyor belts.

The conveyor belts respectively traverse a pair of large diameter discs or drums 159a and 160a mounted upon a shaft 161a journalled for rotation in the frame elements 151a and 152a. The drive pulleys 148a and 149a are located above the drums 159a and 160a in approximate alignment with the shaft 161a thereof, while the pulley wheels 153a and 154a are located below the drums and inwardly of the shaft 161a thereof. As a result, the conveyor belts 146a and 147a are drawn into firm frictional engagement with the respectively associated drums 159a and 160a, and as a consequence, the drums are caused to rotate with the belts.

The conveyor belts 146a and 147a adjacent the drive pulleys 148a and 149a define with the respectively associated drums 159a and 160a the entrance to the discharge conveyor 12a. Such entrance is located adjacent the aforementioned release station 145a, and the collating unit 11a is effective to grip a bag 14 at the bag-gripping station 114 (FIGURE 4) and angularly displace the bag through approximately 90° and into the release station 145a. At substantially the same time that the closed bottom end 15 of such bag enters the bite defined between the conveyor belts 146a and 147a and the respectively associated drums 159a and 160a, the bag is released by the bag-gripping device 107a which displaced the same from the bag-gripping station and into the release station.

The exit end of the conveyor 12a is located adjacent the collection station 13, and constituting a part of the conveyor at such exit end thereof are a pair of rollers 162a and 163a mounted upon a shaft 164a journalled for rotation in the frame elements 151a and 152a. Located adjacent the exit end of the discharge conveyor and extending over the collection station 13 to a position substantially intermediate the vertical walls 16 and 17 of the mechanism defining the collection station, is a guide structure 165a of slightly arcuate shape so as to guide bags downwardly and into the collection station.

The discharge conveyors 12a and 12b are substantially identical and they are continuously energized independently of the remainder of the apparatus and independently of the bag making machine with which the apparatus is employed. The drive means for the discharge conveyors includes a motor 166 mounted upon support structure 167 therefor and having its shaft equipped with a pulley wheel 168 about which is entrained a drive belt 169. The belt is also entrained about a pulley wheel 170 that is mounted upon a shaft 171 which extends into a gear box 172b. Within the gear box the shaft 171 is drivingly coupled with the shaft 150b and is also drivingly connected to a shaft 173 which extends across the apparatus to a gear box 172a. Within the gear box 172a a driving connection is defined between the shaft 173 and the shaft 150a of the discharge conveyor 12a. The shaft 173 may be sectioned or segmented as illustrated, in which event, the various sections thereof are interconnected by conventional couplings. Evidently, whenever the motor 166 is energized, each of the discharge conveyors 12a and 12b are continuously driven and are therefore in a condition to receive a succession of bags and sequentially discharge the same into the collection station 13.

The bags 14 are maintained in the same plane as they are transferred from the bag-gripping station 114 into the bag release station (i.e., the entrance end of one or the other of the discharge conveyors). In the embodiment of the invention illustrated, such plane is horizontally disposed and is defined, in effect, by the finger plate 105 since each bag is clamped to one or the other of such plates as it is displaced toward a discharge conveyor. Also, the apparatus is equipped with a table or platform, generally denoted 174, along which each bag is guided as it is moved from the exit end of the infeed conveyor 10 to the entrance end of one or the other of the discharge conveyors 12.

Operation

The purely mechanical aspects of an operational sequence of the apparatus, as distinguished from the time relationships thereof, are evident from the foregoing description. Accordingly, it need only be said that the apparatus functions to receive a succession of bags which are fed thereto in a predetermined orientation, and to direct a pre-established number of such bags into one sub-stream and then direct the next successive pre-established number of bags into another sub-stream. The discharge of each such sub-stream is assembled at a collection station in an arrangement by which the bags respectively constituting the discharge of such sub-streams are oriented in opposite directions. The precise number of bags which are alternately diverted into one or the other of such sub-streams will depend upon the use of the apparatus and any particular installation; and again repeating the prior example, a succession of bags comprising 50 in number may constitute each successive group. Thus, the bags at the collection station 13 of the apparatus will be oriented, as shown in FIGURE 2, in successive 50-bag hands 18a and 18b.

In the apparatus illustrated, the discharge conveyors 12a and 12b have the exit ends thereof oriented at substantially the same elevation and, therefore, the apparatus is essentially symmetrical in a geometric sense about a vertical plane therethrough. However, the exit ends of such conveyors could be oriented at different elevations and, in certain instances, the bags discharging from one conveyor could be collected at one location and the bags discharging from the other conveyor could be collected at a different location. In such event, means would be included to subsequently bring the groups together at a common location or collection station.

As indicated hereinbefore, bags can be delivered in succession to the apparatus by any convenient means, but in the usual instance, the apparatus will be associated with a bag making machine and the discharge therefrom, as shown in FIGURE 1, will be directed into the infeed conveyor 10 of the apparatus. Thus, the entire bag making operation can be made substantially automatic from the initial formation of the bag tubes to the collection of the completed bags in collated bundles.

Where the collating apparatus is employed in association with bag-making machinery, it may be advantageous to drive the apparatus from such machinery so that a fixed time relationship is conveniently maintained therebetween. Accordingly, in the apparatus illustrated, the drive therefor includes a main shaft 36 which is driven from the bag making machinery, and the collating units 11a and 11b are both driven from such shaft. Also, the turning wheel 21 is driven therefrom and, as indicated hereinbefore, such turning wheel is structurally similar to each of the collating units 11 except that the cycling cam 91 is omitted. In view of this structural omission of the cycling cam, the various components associated therewith may also be eliminated such as the drive gear 88, driven gear 93, and the driven gear structure 94; and in addition, each of the bag-gripping devices may omit the latching mechanism constituting the latch 135, lock-out arm 139 and the various components associated therewith. Thus, the turning wheel 21 defines a simple cycle of operation in which each of the bag-gripping devices 25 in turn closed into gripping engagement with a bag at the station 37, and thereafter released such bag at the entrance end of the infeed conveyor 10.

Clearly, then, the turning wheel 21 is synchronized with the bag making machinery since it is driven thereby and rotates whenever such machinery is in operation. Similarly, the infeed conveyor 10 is continuously actuated whenever the bag making machinery is in operation and is synchronized therewith. Since each of the collating units 11 is driven from the shaft 36, the rotational movement of such units is also synchronized with the conveyor 10, turning wheel 21, and the associated bag making machinery.

Except for the direction of rotation imparted to the collating units 11a and 11b, the operation and structural composition thereof are essentially identical, as indicated hereinbefore; and as will be more especially considered hereinafter, the collating units function in an opposite phase relationship so that when one of the units is operative to control the movement of a sequence of successive bags, the other unit is idling, and vice versa. Considering the situation in which one of the collating units is operative, the actuator cam 108 thereof, because of its configuration, causes each of the cam followers 111 (there being five thereof in the structure illustrated) as it enters the gripping station 114 to be displaced outwardly and into the position illustrated by full lines in FIGURES 6 and 7 (and illustrated on the left-hand side of the shaft 76a in FIGURE 5) in which the gripper fingers 115a and 115b are displaced downwardly into resilient engagement with the underlying finger plate 105 or with a bag 14 positioned thereon.

This closed position of the gripper fingers is maintained by the cam 108 while the collating unit rotates through approximately 90° at which time the gripped bag is located in the discharge station 145. At this time, the configuration of the cam 108 permits the cam follower 111 to be displaced inwardly by the resilient spring force biasing the same toward such position; whereupon the gripper fingers 115 and 116 are returned to their open position. Such open position of the fingers is illustrated in FIGURE 5 by the finger 115b, and the corresponding position of a bag-gripping device is shown by the device 107a on the right-hand side of the shaft 76a in this same figure (also see the position of the device 107a shown by broken lines in FIGURE 7). Therefore, as each of the five bag-gripping devices 107 of an active collating unit are successively advanced into the bag-gripping station 114, the fingers 115 and 116 thereof are displaced into the closed bag-gripping position, and such fingers are subsequently permitted to return to the open position thereof as they are advanced into the release station 145.

The manner in which control of the bags is alternately shifted from one to the other of the collating units 11 after each unit in turn processes the predetermined count or number of bags involves the configuration of the cycling cams 108 and the rates of rotation thereof relative to the respectively associated finger plates 105 and bag-gripping devices 107 carried thereby. Such configuration is illustrated in FIGURE 8 in which a cycling cam 91, actuator cam 108, the respectively associated cam follows 113 and 111, and bag-gripping devices 107 of one collating unit are diagrammatically depicted. As shown in this figure, the cycling cam 91 is divided into 10 equal sections alternately constituting a rise and a fall or depression. Since the cam is circular, each such section has an angular length of 36°. Accordingly, and in sequence, there is a rise having a length of 36°, a fall having a length of 36°, another rise, then another fall, etc.

The bag-gripping devices 107 are equally spaced and, therefore, the centers of the five successive devices are separated by 72°. Similarly, the cam followers 113 are spaced from each other by 72° and the cam followers 111 are spaced from each other by an amount that can be generally taken to be 72°, although the precise spacing therebetween varies one from the other and such variance together with reasons therefor will be discussed hereinafter. Accordingly, when the five cam followers 113 are aligned respectively with and are thereby engaging the five raised sections of the cycling cam, the latching mechanism of each of the bag-gripping devices 107 (which mechanisms each comprise a latch 135, extension 136 and abutment 137 thereof, and the lock-out arm 139) has the configuration shown by full lines in FIGURE 7. In such configuration, each latching mechanism is in the inoperative position thereof and the bag-gripping devices are therefore free to be reciprocated between their open and closed positions in accordance with the motion enforced thereon by the actuator cam 108. Conversely, when the five cam followers 113 are respectively aligned with and are thereby engaging the five depressed sections of the cycling cam, the latching mechanism of each of the bag-gripping devices 107 has the configuration shown by broken lines in FIGURE 7 and the latching mechanism is therefore engaged and constrains the gripping fingers 115 and 116 in the open position thereof.

The finger plate 105 is depicted in FIGURE 8 as the central circular section and the direction of rotation thereof is clockwise as indicated by the arrow thereon. Similarly, then, the direction of rotation of the cycling cam 91 is clockwise, as indicated, and since the bag-gripping devices 107 are directly mounted upon the finger plate 105, and since the cam followers 111 and 113 comprise a part of the respectively associated bag-gripping devices, all of these elements necessarily rotate with the finger plate. It will be recalled that the actuator cam 108 is a stationary component.

As explained hereinbefore with particular reference to FIGURE 5, the cycling cam 91 rotates at a slightly lesser velocity than that of the finger plate 105 because of the differential gearing through which the cycling cam is driven and which is defined by the drive gear 88, driven gear 93, and the idler gear structure 94. Differential velocities or speed reduction as between the finger plate and cycling cam may be obtained in any convenient manner as by suitable determination of the diameters of the various gears, or by having slightly less teeth in the idler gear section 96 than in the section 95 thereof.

In accordance with the aforementioned example in which bags are grouped into 50-bag hands, it is necessary that each collating unit 11 rotate through ten complete revolutions in order that 50 bags be processed thereby (five bag-gripping devices 107 multiplied by ten revolutions gives 50 bags). Therefore, considering such specific example in which the collating unit must make ten complete rotations to process 50 bags and taking the case in which each rise and fall on the cycling cam has an arcuate length of 36°, it is necessary that the cycling cam 91 loose 3.6° with respect to the finger plate 105 during each complete revolution of the finger plate. This relationship causes the cam followers 113 to traverse an entire 36° section of the cycling cam as the finger plate 105 makes ten complete revolutions. Consequently, each of the cam followers 113 completely traverses one such section and therefore moves from a rise to a fall, and vice versa.

As explained hereinbefore, the collating units 11a and 11b operate in an out-of-phase relationship so that, for example, the cams 113a of the collating unit 11a are traversing the respective raised sections of the cycling cam 91a while the cams 113b of the collating unit 11b are traversing the depressed sections of the cycling cam 91b. Evidently, then, when the collating unit 11a is processing a sequence of 50 bags to divert the same into the discharge conveyor 12a, the collating unit 11b is idling, and vice versa.

The collating apparatus is adapted for use with relative high-speed bag making machinery and the two collating units necessarily rotate at a rapid rate. Evidently then, the mergence of each raised section along the cycling cam 91 with the adjacent depressed sections thereof would be quite steep and excessively sharp were it necessary that all of the bag-gripping devices 107 change at the same time from an operative to inoperative condition, and vice versa. The necessity for such occurrence is avoided in the collating apparatus being considered by causing each of the bag-gripping devices 107 to commence shifting from its operative to its inoperative condition as soon as it has released at the discharge station 145 the final bag to be processed thereby in each operational sequence. As a result of this arrangement, each device has an arcuate distance of approximately 270° in which to effect such shift in condition thereof (that is, the angular distance between the discharge station 145 and gripping station 114 measured in the direction of rotation of the collating unit).

More particularly and referring specifically to FIGURE 8, and assuming a condition in which the collating unit there depicted is commencing its final rotation prior to shifting from an operative to an inoperative condition, the bag-gripping device 107 (I) being the initial or lead device commences its transition to the inoperative condition thereof as soon as it releases the bag gripped thereby at the discharge or release station 145, because the associated cam follower 113 concurrently starts to traverse the mergence of the adjacent rise and fall of the cycling cam. However, the next successive bag-gripping device 107 (II) cannot commence its transition to the inoperative condition thereof at the same time because it must continue to grip the bag held thereby for an additional arcuate distance of substantially 72° (that is, when the device I is at the station 145, the device II is 72° behind).

In order to enable the device 107 (II) to maintain its grip on the bag for a time period adequate to permit it to be rotated through such subsequent 72° arc, the cam follower 113 associated with such device 107 (II) is off-set in the trailing direction from the center-line thereof by an arcuate distance of 0.72°—which arcuate off-set is sufficient to enable the bag-gripping device to continue in the operative condition thereof as it traverses the remaining 72° to bring it into the discharge station 145. The same time lag must be provided as between the bag-gripping device 107 (II) and the next successive device 107 (III) so that the cam follower 113 associated with such device 107 (III) must be off-set in a lagging or trailing direction by an additional 0.72° which makes its off-set relative to the device 107 (I) a total of 1.44°. Similarly, the cams 113 of the bag-gripping devices 107 (IV) and 107 (V) are each successively off-set by an additional 0.72° with the result that the cam follower 113 of the device 107 (IV) is off-set by 2.16° relative to the device 107 (I), and the cam 113 of the device 107 (V) is off-set by 2.88° relative to the device 107 (I).

Such successively increasing off-set as between the successive bag-gripping devices 107 is advantageously utilized in the opposite sense when the collating unit shifts from the its inoperative to its operative condition since it enables each of the devices 107 to commence such transition as soon as it had passed the bag-gripping station 114, while delaying the transition of the trailing devices until each, in turn, has rotated beyond the bag-gripping station.

While in the foregoing specification an embodiment of the invention has been described in considerable detail for purposes of making a complete disclosure thereof, it will be apparent to those skilled in the art that numerous changes may be made in such details without departing from the spirit and principles of the invention.

What is claimed is:

1. A collating unit useful in bag collating apparatus, comprising a support element, means for rotating said support element about a predetermined axis, a bag-gripping device carried by said support element for rotation therewith about such axis through angularly spaced bag-gripping and bag-release stations, a gripper member provided by said bag-gripping device and being supported thereby for movement between open and closed positions, actuator mechanism for controlling movement of said gripper member into the open and closed positions thereof in timed relation with the rotation of said support element to close said gripper member onto a bag at such bag-gripping station and thereby effect its displacement angularly into such bag-release station and to open said gripper member thereat and thereby release such bag, selectively operative latch mechanism for maintaining during certain predetermined periods said gripper member in the open position thereof as it traverses such bag-gripping station, and cycling mechanism for controlling said latching mechanism in relation to the rotational movement of said support element and bag-gripping device to make said gripper member inoperative during such predetermined periods.

2. The collating unit of claim 1 in which said cycling mechanism includes cam and cam follower structure cooperatively responsive to the rotational movement of said support element and bag-gripping device to control said gripper member in response thereto.

3. The collating unit of claim 1 in which said actuator mechanism includes cam and cam follower structure cooperatively responsive to the rotational movement of said support element and bag-gripping device to control in response thereto the movement of said gripper member between the open and closed positions thereof.

4. The collating unit of claim 1 in which a plurality of bag-gripping devices are carried by said support element for rotation therewith, each of said bag-gripping devices being similarly constructed and similarly operatively controlled by said actuator mechanism and cycling mechanism.

5. A collating unit useful in bag collating apparatus, comprising a support element, means for rotating said support element about a predetermined axis, a bag-gripping device carried by said support element for rotation therewith about such axis through angularly spaced bag-gripping and bag-release stations, a gripper member provided by said bag-gripping device and being supported thereby for movement between open and closed positions, actuator mechanism for controlling movement of said gripper member into the open and closed positions thereof in timed relation with the rotation of said support element to close said gripper member onto a bag at such bag-gripping station and thereby effect its displacement angularly into such bag-release station and to open said gripper member thereat and thereby release such bag, selectively operative latch mechanism for maintaining during certain predetermined periods said gripper member in the open position thereof as it traverses such bag-gripping station, and cycling mechanism including a cam follower for controlling said latching mechanism and being carried by said support element for rotation therewith, said cycling mechanism also including a cycling cam engaged by said cam follower and being rotatable relative to said support element and having raised and depressed surface areas therealong respectively corresponding to one or the other of the latch and release conditions of said latching mechanism, and further including means for rotating said cycling cam in the same angular direction as said support element and at a predetermined velocity difference with respect thereto so that for a predetermined number of rotations of said support element said cam follower is in engagement with a raised surface area of said cycling cam and said latching mechanism is in one of the latch or release positions thereof and for another predetermined number of rotations of said support element said cam follower is in engagement with a depressed surface area of said cycling cam and said latching mechanism is in the other such position thereof.

6. The collating unit of claim 5 and further comprising a drive shaft constituting a part of said means for rotating said support element and constituting also a part of said means for rotating said cycling cam, and differential gearing operatively connected with said drive shaft to effect the aforesaid difference in the rotational velocities of said support element and cycling cam.

7. The collating unit of claim 5 in which the raised and depressed surface areas of said cycling cam are substantially equal in angular extent and in number.

8. The collating unit of claim 7 in which a plurality of bag-gripping devices equally spaced apart and equal in number to said raised surface areas are carried by said support element for rotation therewith, each of said bag-gripping devices being similarly constructed and similarly operatively controlled by said actuator mechanism and cycling mechanism.

9. The collating unit of claim 5 in which said actuator mechanism includes cam and cam follower structure cooperatively responsive to the rotational movement of said support element and bag-gripping device to control in response thereto the movement of said gripper member between the open and closed positions thereof.

10. Collating apparatus comprising: a pair of spaced apart collating units having a common bag-gripping station defined therebetween and having also separate bag-release stations angularly spaced from said bag-gripping station and respectively associated with said collating units; each of said collating units including a support element, means for rotating the same about a predetermined axis, a bag-gripping device carried by the support element for rotation therewith about such axis through the bag-gripping station and through the associated bag-release station, a gripper member provided by said bag-gripping device and being supported thereby for movement between open and closed positions, actuator mechanism for controlling movement of said gripper member into the open and closed positions thereof in timed relation with the rotation of said support element to close said gripper member onto a bag at such bag-gripping station and thereby effect its displacement angularly into the associated bag-release station and to open said gripper member thereat and thereby release such bag, selectively operative latch mechanism for maintaining during certain predetermined periods said gripper member in open position thereof as it traverses such bag-gripper station, and cycling mechanism for controlling said latching mechanism in relation to the rotational movement of said support element and bag-gripping device to make said gripper member inoperative during such predetermined periods; and means for maintaining the cycling mechanisms of said collating units in out-of-phase relation so that when the gripper member of one collating unit is inoperative the gripping member of the other collating unit is operative, and vice versa.

11. The collating apparatus of claim 10 in which each of said collating units is equipped with a plurality of said bag-gripping devices carried by the associated support element in angularly spaced relation and being controlled by the associated actuator and cycling mechanisms.

12. The collating apparatus of claim 11 in which each of said cycling mechanisms includes cam and cam follower structure cooperatively responsive to the rotational movement of the associated support element and bag-gripping devices to control said gripper members in response thereto, and in which each of said actuator mechanisms includes cam and cam follower structure cooperatively responsive to the rotational movement of the associated support element and bag-gripper devices to control in response thereto the movement of the associated gripper members between the open and closed positions thereof.

13. The collating apparatus of claim 12 in which the cam and cam follower structure of each cycling mechanism includes a cycling cam and a cam follower engaging the same, each cycling cam being rotatable relative to the associated support element and having raised and depressed surface areas therealong respectively corresponding to one or the other of the latch and release conditions of the associated latching mechanism, and further includes means for rotating said cycling cam in the same angular direction as the associated support element and at a predetermined velocity difference with respect thereto so that for a predetermined number of rotations of the support element the cam follower associated therewith is in engagement with a raised surface area of its cycling cam and the latching mechanism associated therewith is in one of the latch or release positions thereof and for another predetermined number of rotations of the support element the associated cam follower is in engagement with a depressed surface area of said cycling cam and said latching mechanism is in the other such position thereof.

14. The collating apparatus of claim 13 and further comprising a drive shaft constituting a part of each of said means for respectively rotating said support elements and constituting also a part of each of said means for respectively rotating said cycling cams, and differential gearing operatively connected with said drive shaft to effect the aforesaid difference in the rotational velocities of each of said support elements and the cycling cams respectively associated therewith.

References Cited

UNITED STATES PATENTS

| | | | |
|---|---|---|---|
| 2,349,638 | 5/1944 | Schreiber | 198—210 |
| 2,984,337 | 5/1961 | Couch et al. | 198—210 |
| 3,175,702 | 3/1965 | Banyas | 198—210 X |

GERALD M. FORLENZA, *Primary Examiner.*

GEORGE F. ABRAHAM, *Assistant Examiner.*

U.S. Cl. X.R.

198—210; 214—1, 6.5